United States Patent [19]

Lang

[11] Patent Number: 4,815,551

[45] Date of Patent: Mar. 28, 1989

[54] SERVOSTEERING, ESPECIALLY FOR MOTOR VEHICLES

[75] Inventor: Armin Lang, Schwäb.-Gmünd, Fed. Rep. of Germany

[73] Assignee: Zahnradfabrik Friedrichshafen, AG, Friedrichshafen, Fed. Rep. of Germany

[21] Appl. No.: 878,992

[22] PCT Filed: Oct. 1, 1985

[86] PCT No.: PCT/EP85/00510

§ 371 Date: May 30, 1986

§ 102(e) Date: May 30, 1986

[87] PCT Pub. No.: WO86/02053

PCT Pub. Date: Apr. 10, 1986

[30] Foreign Application Priority Data

Oct. 5, 1984 [WO] PCT Int'l Appl. ............ PCT/EP84/00308

[51] Int. Cl.⁴ .................................... B62D 5/06
[52] U.S. Cl. .................................... 180/143; 180/141; 91/371
[58] Field of Search .................... 180/141, 142, 143; 91/371, 372, 434, 465

[56] References Cited

U.S. PATENT DOCUMENTS

| | | | |
|---|---|---|---|
| 3,922,953 | 12/1975 | Strauff | 91/371 |
| 4,071,109 | 1/1978 | Ezoe | 180/143 |
| 4,344,284 | 8/1982 | Lang | 60/433 |
| 4,385,493 | 5/1983 | Lang | 60/464 |
| 4,390,158 | 6/1983 | Lang | 251/129 |
| 4,438,827 | 3/1984 | Lang | 180/143 |
| 4,462,478 | 7/1984 | Lang | 180/143 |
| 4,557,344 | 12/1985 | Lang | 180/143 |

Primary Examiner—David M. Mitchell
Assistant Examiner—Donn McGiehan
Attorney, Agent, or Firm—Albert M. Zalkind

[57] ABSTRACT

A Servosteering system especially for motor vehicles utilizes a piston type of control valve having reaction chambers for simulating steering resistance in the course of a turn. Communication for pressure flow to the reaction chambers is via fixed throttle in series with a speed responsive variable throttle which at low speeds reduces the simulated steering resistance to low or non-existent, as in parking, but varying to higher steering resistance at higher speeds. Additionally, a pressure reduction valve is series connected with the fixed throttles. Reaction chamber pressure is thus held to a maximum so that simulated steering resistance, is comfortable in a tight turn.

4 Claims, 4 Drawing Sheets

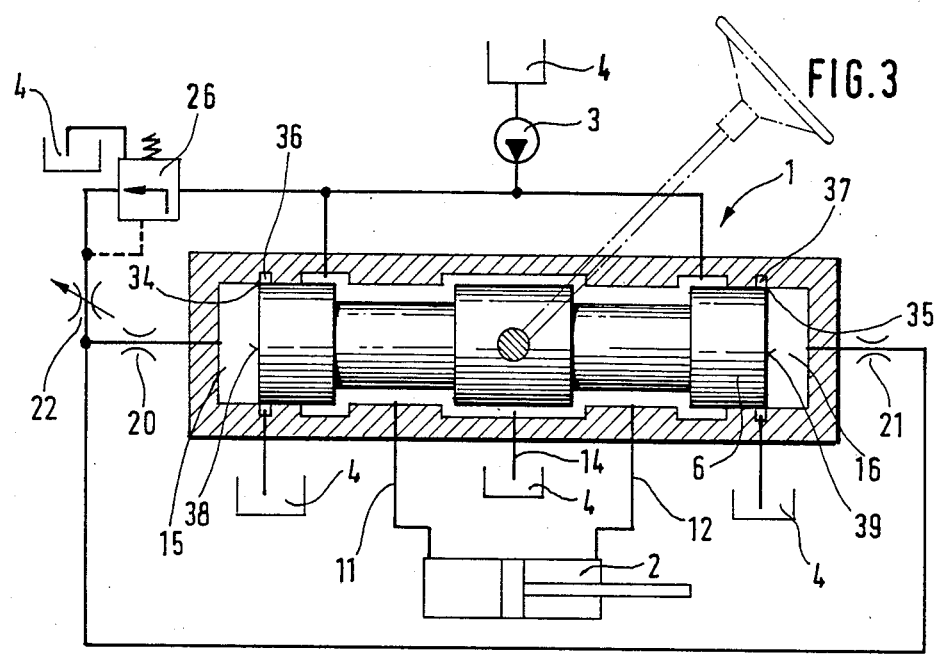
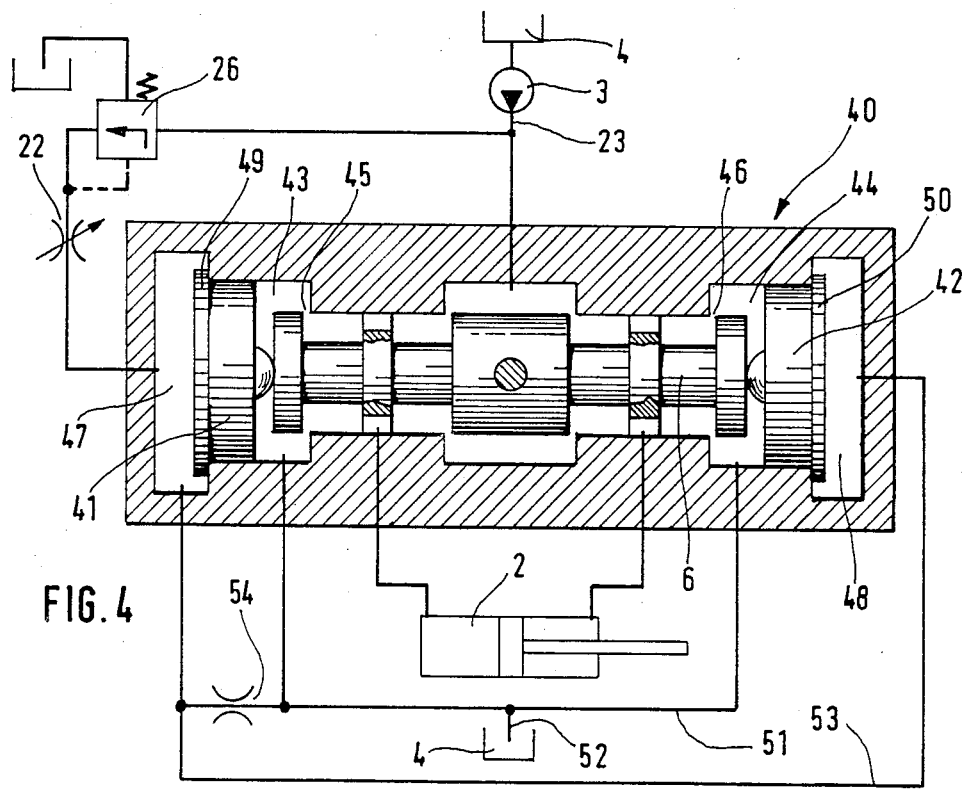

SERVOSTEERING, ESPECIALLY FOR MOTOR VEHICLES

BACKGROUND OF THE INVENTION

German Pat. No. OS 31 22 370, the counterpart of which is U.S. Pat. No. 4,438,827 to Armin Lang, the applicant herein, shows a system of speed responsive control of reaction chamber pressure wherein a pressure reduction valve is located between a speed responsive throttle and a fixed throttle connected to each of the reaction chambers of a manually operated servosteering control valve. The pressure from the pressure reduction valve is constant and can be felt in the reaction chamber or chambers at high and low speeds. In a low speed tight turn when the exit pressure of the speed responsive valve would rise even at low speed, the vehicle operator would have to use the effort necessary to overcome the maximum exit pressure of the pressure reduction valve which will always be the same, as indicated in the graph of FIG. 6 of this application.

Thus, at low speeds in tight turns the force of turning the steering wheel is excessive under the circumstances and occasions driver discomfort.

BRIEF DESCRIPTION OF THE PRESENT INVENTION

The improvement effected herein has a different arrangement by which the maximum steering force felt by the driver decreases with decreasing vehicle speed, depicted in the graph of FIG. 7 of this application.

Such improvement is brought about by making reaction force to be overcome by the driver dependent on vehicle speed, which force decreases with vehicle speed. Thus, the sequence of connection is such that the pressure reduction valve responds to the pressure difference between the upstream and downstream sides of the speed responsive throttle valve in series with a fixed throttle valve.

The pressure reduction valve is connected either upstream or downstream of the series arrangement.

The result is that in slow tight turns the vehicle driver does not have to exert the manual effort that was required by the prior art arrangement.

The particular distinction between the background of the invention is clearly brought out in comparing FIG. 3 of U.S. Pat. No. 4,438,827 with the present invention. In the prior patent, the pressure reduction valve 42 is in series between the speed responsive throttle 22 valve and one of the fixed throttles 20 or 21, depending on direction of steering. In the present invention, e.g., FIG. 1, the pressure reduction valve 26 is in series with but before the speed responsive throttle valve 22 and a fixed throttle depending on direction of steering.

Thus, in the present invention, a respective check valve in the servomotor steering control valve piston 6 will open to establish a connection for the pressure reduction valve to be in parallel across the speed responsive valve in series with a fixed throttle.

A detailed description of the drawing now follows in conjunction with the appended drawing in which:

FIGS. 2-5 show various embodiments of the system;

Figure 1:
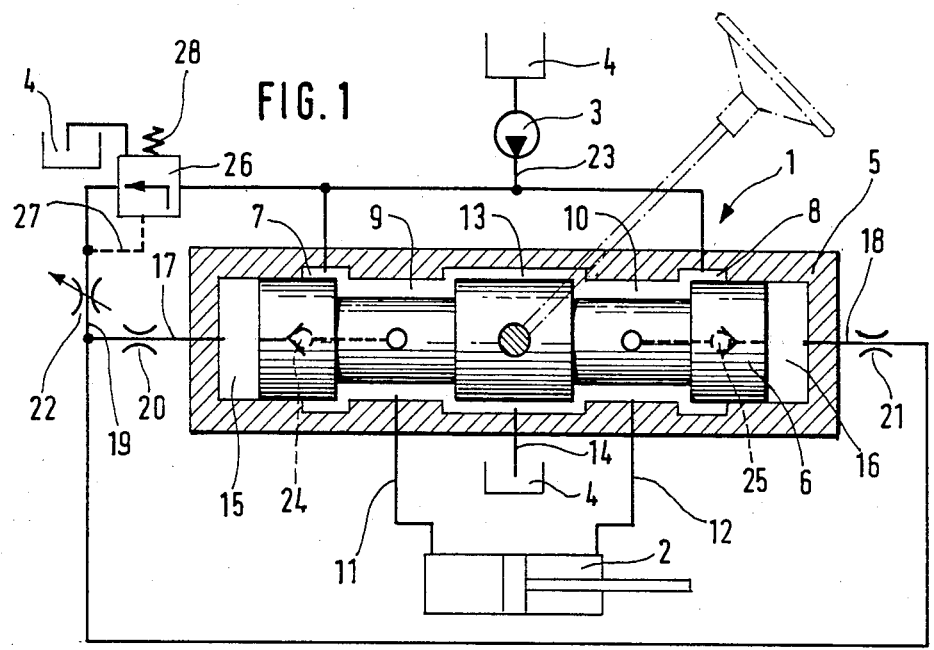
FIG. 1 shows a schematic presentation of a preferred form of the invention.

Referring to FIG. 1 which shows the most preferred embodiment, there is shown a steering control valve 1 for a steering linkage (not shown) wherein a pressure agent e.g. oil, is fed to a booster cylinder or servomotor 2 from a servopump 3 and after being utilized in the system ultimately returns to a tank 4.

The steering control valve 1 has a piston 6 in a valve housing 5 which piston is shiftable as by a steering wheel, is indicated by phantom lines in FIG. 1.

Pressure fluid from servopump 3 feeds into two annular housing grooves 7 and 8. Two piston grooves 9 and 10 of piston 6 connect by respective lines 11 and 12 with respective pressure chambers of servomotor 2. A centered annular groove 13 of the housing is connected via a return line 14 with a tank 4.

At the ends of piston 6 there are respective reaction chambers 15 and 16. From the reaction chambers 15 and 16 respective reaction pressure lines 17 and 18 connect with a common line 19.

In lines 17 and 18, intermediate the reaction chambers 15 and 16 and the common line 19, there are respective fixed throttles 20 and 21.

The common line 19 connects to a pressure line 23 of the servopump 3 through a speed responsive variable throttle valve 22, hereinafter referred to as a speed responsive throttle. The speed responsive throttle may be of a type having a pivotal plate as shown in U.S. Pat. No. 3,690,400 to Uchiyami or it may be a solenoid valve operated as a speed responsive valve as shown in German Pat. No. OS 30 41 824 having the U.S. counterpart to Lang U.S. Pat. No. 4,390,158. It is essential that between the fixed throttles 20 and 21 and the pump outlet pressure line 23 a speed responsive valve 22 be inserted into line 19.

Between the reaction chambers 15 and 16 and the respective operating pressure chambers of servomotor 2, check valves 24 and 25 are disposed which are openable in a direction toward the pressure chambers of servomotor 2. The check valves may be disposed either as illustrated in FIG. 1 in the valve piston 6 between piston grooves 9 and 10, respectively, and the reaction chambers 15 or 16, respectively, or they can be installed between lines 11 or 12 and respective reaction pressure lines 17 and 18.

In line 19 between the outlet of servopump 3 and the speed responsive throttle 22 a pressure reduction valve 26 is connected. The pressure reduction valve 26 is responsive to pressure in a control line 27, usually built in the pressure reduction valve 26 as indicated by the dotted line, which pressure is on the upstream side of the speed responsive throttle 22 wherein such pressure acts in the closing direction of the pressure reduction valve 26 against the pressure in tank 4 aided by the force of a spring 28. Thus, the spring 28 acts on the pressure reduction valve 26 with a bias force toward the opening position. In either steering direction the pressure acting downstream of one of the throttle 20 or 21, respectively, corresponds to the pressure in tank 4. Accordingly, the full pressure differential across the throttling combination of the series throttles 22 and 20 or 22 and 21, respectively, is acting on the pressure reduction valve 26. This pressure differential acting on the throttle combination of the series throttles, namely, the speed responsive throttles 22 and a fixed throttle 20 or 21 is controlled to a predetermined value by means of the pressure reduction valve 26.

In the embodiment of FIG. 1 the speed sponsive throttles 22 as well as the pressure reduction valve 26 are disposed between the servopump 3 and line 19 which connects to the fixed throttles 20 and 21 as shown. However, as shown in the embodiment of FIG. 2 the speed responsive valve 22 and the pressure reduction valve 26 are disposed in a return line 29 which is a continuation of line 19 connecting via line 30 the two fixed throttles 20 and 21 to respective reaction chambers 15 and 16.

The pressure reduction valve 26 is connected via a control line 31 to the output pressure line 23 from the servopump and is thus acted upon by the pressure upstream of the fixed throttles 20 or 21, selectively, dependent on direction of steering, in series with the speed responsive throttle 22 for closing force. However, the pressure reduction valve 26 is also responsive to pressure in a control line 32 with the pressure downstream of the speed responsive valve 22 and thus downstream of the fixed throttles 20 or 21 in series with speed responsive valve 22, spring 28 acting in conjunction therewith for opening force.

Figure 2:
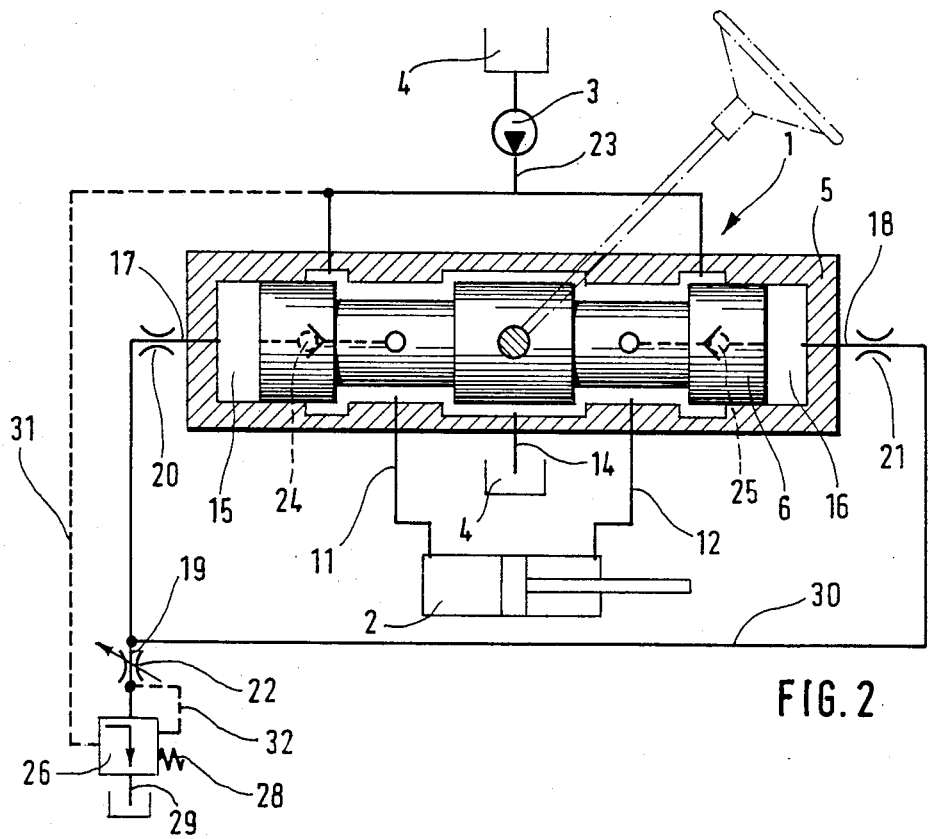

The arrangement as shown in FIG. 2 also differs from that in FIG. 1 in that the check valves 24 and 25 are openable in directional flow from the pressure of servomotor 2 to a reaction chambers 15 or 16.

The particular advantage of the arrangement of FIG. 2 resides in the fact that the reaction chambers are operated with pressure even in the case of a closed speed responsive throttle 22 and as a result have a higher damping effect.

In FIG. 3 an embodiment is disclosed utilizing the fixed throttles 20, 21 and speed responsive throttle 22 with a pressure reduction valve 26 for a manually operable steering control valve having reaction chambers 15 and 16 but wherein check valves such as 24 and 26 heretofore utilized in the previously disclosed embodiments are not used. In this instance control edge pairs 34 and 35 control flow gaps, shown as having zero overlap, and utilized to control flow by being disposed between respective annular grooves 36 or 37 of the housing and a respective end surface 38 or 39 of piston 6. The two housing annular grooves 36 and 37 connect to the tank 4.

FIG. 4 shows a pressure reduction valve 26 in an embodiment having a steering control valve 40 with a piston 6 having reaction pistons 41 and 42. Between the piston 6 and the reaction pistons 41 or 42 there are inner reaction chambers 43 and 44, respectively, under control of respective flow control edge pairs 45 and 46. Outer respective chambers 47 and 48 are provided of which only one is active in each direction of steering, since the reaction pistons 41 and 42 are limited in their movement toward the center of the steering control valve 40 by stop collars 49 or 50. The inner reaction chambers 43 and 44 are connected directly with one another by a line 51 and to the tank 4 by a branch line 52. The outer reaction chambers 47 and 48 are connected to each other via a line 53.

The output pressure line 23 of the servopump 3 is connected to the outer reaction chambers and to the connecting line 53 via the pressure reduction valve 26 and the speed responsive throttle 22. Between the connecting lines 51 and 53, a fixed throttle 54 with a constant cross section has been disposed. The inner reaction chambers 43 and 44 on the one hand and the outer reaction chambers 47 and 48 on the other hand thus correspond, respectively, to the reaction chambers 15 and 16 of the embodiments of FIGS. 1 to 3. As a result of the separation of the inner reaction chambers 43 and 44 and the outer reaction chambers 47 and 48 by the reaction pistons 41 and 42, only one fixed throttle 54 need be disposed between the two reaction chamber groups.

In FIG. 4 the pressure reduction valve 26 is disposed in the same manner and is acted upon by the same pressures as the pressure reduction valve 26 in FIG. 1.

Figure 5:
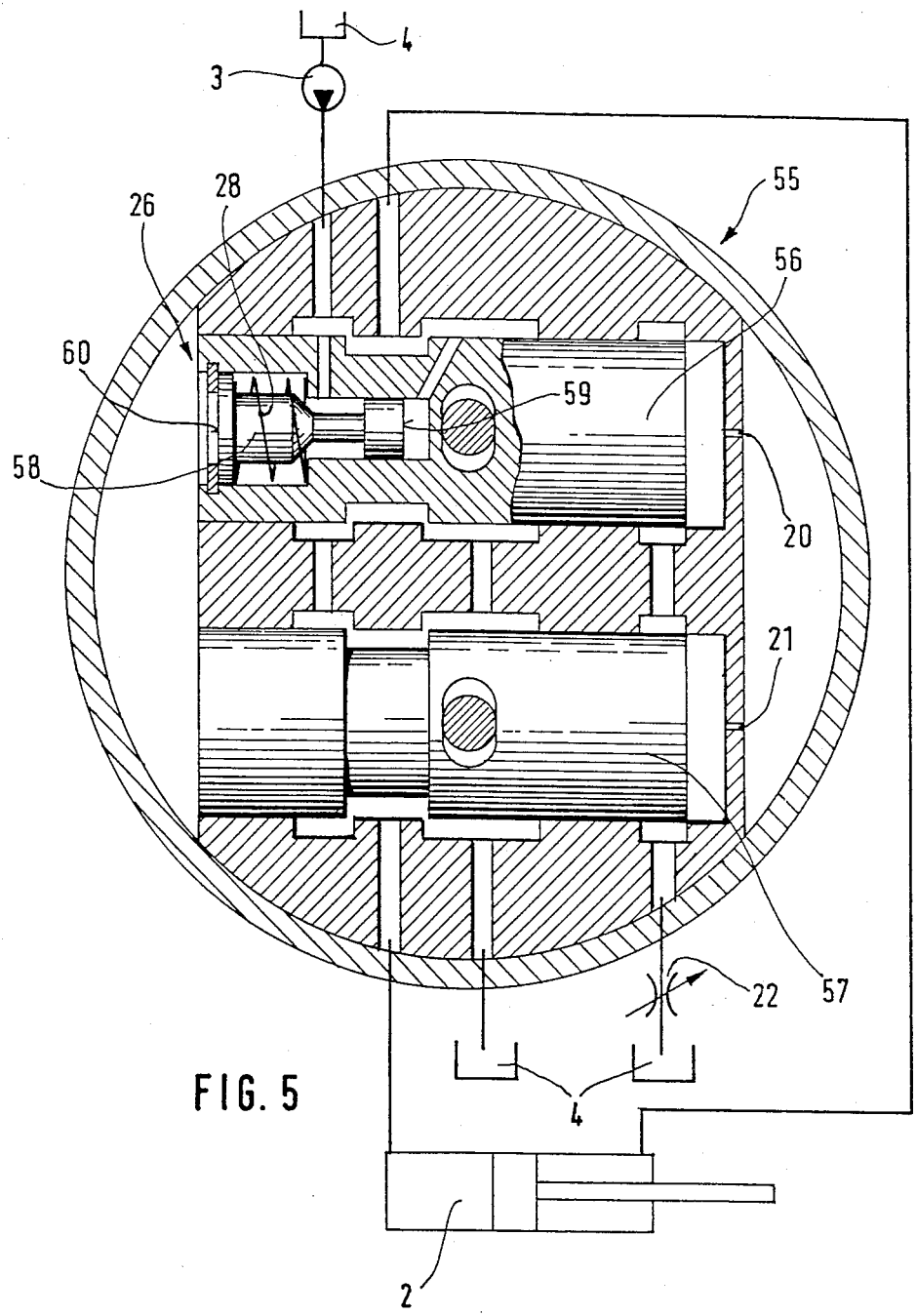

FIG. 5 shows an embodiment wherein a steering control valve 55 has two piston valves 56 and 57. The pressure reduction valve 26 is disposed in the one valve piston 56. The valve piston 58 of the pressure reduction valve 26 has a smaller front surface 59 exposed to the pressure downstream of the throttle 20 or 21 connected in series with speed responsive throttle 22. As seen in FIG. 5, this is the pressure of tank 4. The force of the spring 28 acts in the same direction as this pressure, i.e., to the left as seen in FIG. 5. The pressure prevailing upstream of the throttles 20 or 21 with 22 connected in series acts on the larger front surface 60 of the valve piston 58.

In FIG. 2 the pressure reduction valve discharges to the tank, but not in the other embodiments.

In the embodiments of FIGS. 3 and 5 the speed responsive throttle 22 and the pressure reduction valve 26 may be arranged as in FIG. 1 or as in FIG. 2.

Figure 6:
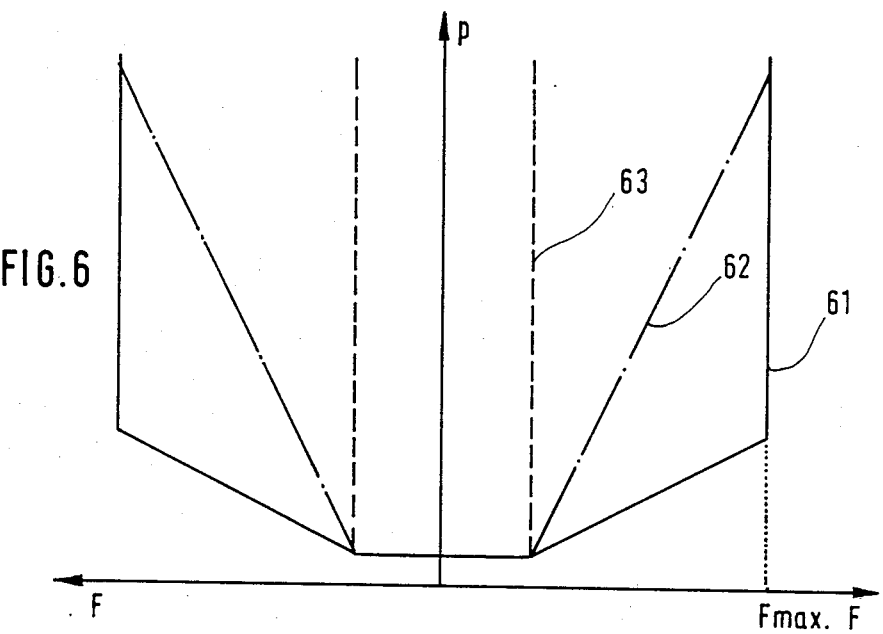
FIG. 6 shows characteristic lines at various speeds in a graph of a servosteering system of the prior art.

Thus, in FIG. 6, Fmax represents a constant high steering effort required of the driver. On the other hand in FIG. 7 Pmax is the maximum upstream pressure of speed responsive throttle 22 at which pressure reduction valve 26 is closed.

The arrow with a tail to the end of square (5.2.2.3) is the symbol for a valve piston. The square (5.1.3 or 7.1.1) symbolizes the valve housing. According to 7.4.1.2 such an arrow within a square means that there is one throttling orifice normally open. Referring to FIG. 1 of the drawing the pressure reducing valve 26 is such a valve the piston of which is controlled on one side by the pressure in the control line 27 and on the other side by the spring 28 and the pressure of the tank 4. The connection to the tank on the spring side means that this side of the piston is vented to the tank. [7.4.2 and 7.4.5 of the ISO 1219 show pressure relief valves and pressure reducing valves, respectively.]

It is not the reaction chamber pressure which is altered or controlled but the pressure ratio between the pressure in the reaction chamber and the working pressure. When the speed in a tight turn decreases, it is first the pressure ratio which decreases controlled by the throttle. In this case the pressure in the reaction chamber decreases only when the pressure in the cylinder remains at the same level or does not increase to correspond with the pressure ratio. If, however, the pressure in the cylinder is increasing in a tight turn, it is possible that the absolute reaction pressure and with it the force at the steering wheel increases although the vehicle speed has been decreasing.

Valve 26 of FIGS. 1, 3, 4, 5 does not shunt to the tank and is controlled by the pressure difference between the pump pressure and the tank pressure (plus the force of the spring 28). Valve 26 of FIG. 2 does shunt to the tank. In this case valve 26 is controlled by the pressure difference between the pump pressure and the pressure downstream of the throttles 20 or 21 and 22. In both cases the valve 26 is controlled by the whole difference between the pressure upstream of the throttles and the pressure downstream of the throttles.

All of the pressure reduction valves 26 are of a known standard type as shown in the international symbols for pressure reduction valves as found in the publication ISO 1219, reference ISO 1219-1976 published by International Organization for Standardization.

FIG. 6 shows a graph of characteristic lines of a servosteering system of the prior art. The changeable reaction force in servosteering system is controlled responsive to the speed of the vehicle such that with a decreasing speed, the characteristic line is changed from the high speed solid line 61 to the low speed dash dot line 62 during vehicle running. The broken line 63 depicts parking. For low speeds of the vehicle as depicted by line 62, relatively high forces occur which attain maximum to the manual steering cutoff force $F_{max}$ i.e. the limit of manual effort especially in steering tight curves when servopressure rises very high.

Figure 7:
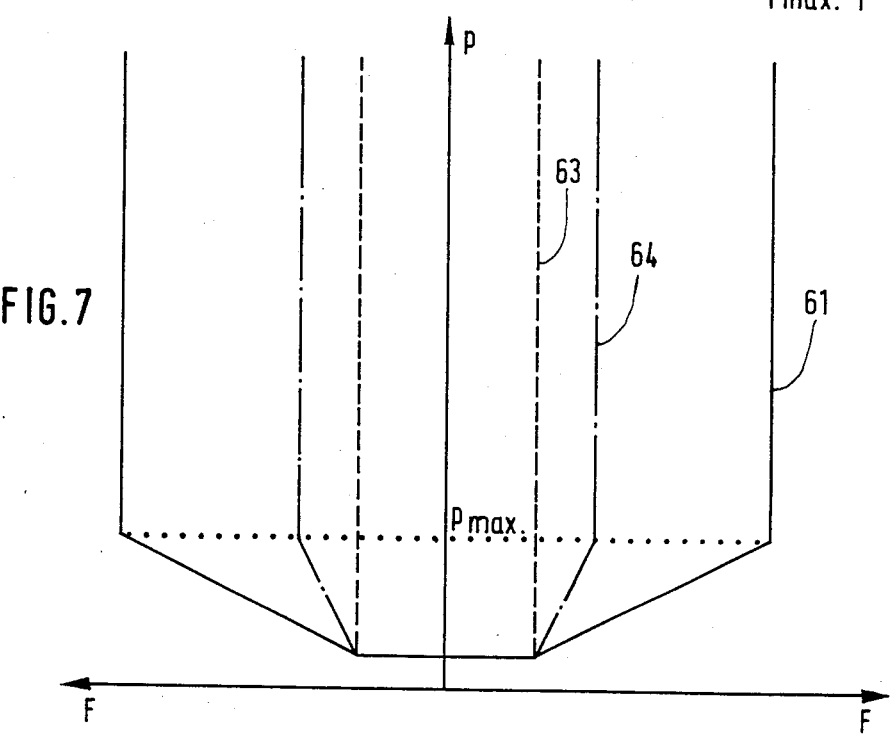
FIG. 7 shows a graph of characteristic lines at various speeds in a servosteering of the invention.

In FIG. 7, the graph of characteristic lines is shown for a servosteering according to the invention. Whenever the servopressure lies below the response threshold of the pressure reduction valve 26, the steering force operates unchanged, as occurs in the prior art. However, whenever the servopressure exceeds the response threshold of the pressure reduction valve 26, then the pressure upstream of the throttles 20 or 21 with 22 in series no longer changes responsive to the pressure of the servopump 3. Thus, the flow conditions through the throttles and thus also the reaction pressure, and the operating pressure remain constant on the steering wheel. Independently of the control of the speed responsive throttle 22, the characteristic lines are above the response pressure of the pressure reduction valve 26, i.e., rising vertically above the pressure $P_{max}$. In FIG. 7 pressure Pmax is the maximum pressure upstream of speed responsive throttle 22 at which pressure reduction valve 26 closes. The line 61 depicts a high vehicle speed and the line 63 depicts a low vehicle speed. The dash-dot line 64 depicts a characteristic line for medium speed.

I claim:

1. In a servosteering system, especially for a motor vehicle having a servomotor (2), a servopump (3), a tank (4), and control valving comprising:
    piston means for controlling servomotor flow,
    reaction chambers (15, 16, 43, 44) subjected to variable pressures operative on said piston means for simulating road resistance,
    a fixed throttle means (20, 21, 54) for communicating with each reaction chamber (15, 16, 43, 44), and
    a speed responsive variable throttle (22) having a flow connection with a fixed throttle means (20, 21, 54),
    wherein the improvement comprises:
    a pressure reduction valve (26) connected in series with said speed responsive variable throttle (22) and with each fixed throttle means (20, 21, 54) and operative to limit pressure from the servopump (3) to said reaction chambers (15, 16, 43, 44) for limiting steering effort independently of said speed responsive variable throttle (22) in tight turn, wherein the pressure reduction valve (26) is connected between the servopump (3) and the speed responsive variable throttle (22), thus making the reaction pressure variable and responsive to the changing speed of the motor vehicle.

2. In a servosteering system set forth as in claim 1, wherein the pressure reduction valve (26) is responsive to pilot pressure in a control line (27, 31) upstream of the fixed throttle means (20 or 21) and the speed responsive variable throttle (22), including spring means (28) biasing said pressure reduction valve (26) in an opening direction.

3. In a servosteering system as set forth in claim 1, wherein the pressure reduction valve (26) is disposed in the piston means (56) of the control (55) valve.

4. In a servosteering system as set forth in claim 3, wherein the pressure reduction valve (26) is responsive to pilot pressure in a control line upstream of the fixed throttle means (20 or 21) and the speed responsive variable throttle (22), including spring means (28) biasing said pressure reduction valve (26) in an opening direction.

* * * * *